(12) United States Patent
Kim et al.

(10) Patent No.: US 11,367,438 B2
(45) Date of Patent: Jun. 21, 2022

(54) ARTIFICIAL INTELLIGENCE APPARATUS FOR RECOGNIZING SPEECH OF USER AND METHOD FOR THE SAME

(71) Applicant: LG ELECTRONICS INC., Seoul (KR)

(72) Inventors: Jaehong Kim, Seoul (KR); Hyoeun Kim, Seoul (KR); Hangil Jeong, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 16/490,020

(22) PCT Filed: May 16, 2019

(86) PCT No.: PCT/KR2019/005887
§ 371 (c)(1),
(2) Date: Aug. 29, 2019

(87) PCT Pub. No.: WO2020/230933
PCT Pub. Date: Nov. 19, 2020

(65) Prior Publication Data
US 2021/0407503 A1      Dec. 30, 2021

(51) Int. Cl.
*G10L 15/22* (2006.01)
*G06N 3/08* (2006.01)
(Continued)

(52) U.S. Cl.
CPC ............. *G10L 15/22* (2013.01); *G06N 3/08* (2013.01); *G10L 15/26* (2013.01); *G10L 25/30* (2013.01); *G10L 2015/225* (2013.01)

(58) Field of Classification Search
CPC .... G10L 15/22; G10L 15/26; G10L 2015/225; G10L 25/30
See application file for complete search history.

(56) References Cited

U.S. PATENT DOCUMENTS

| 7,949,533 B2 | 5/2011 | Braho et al. |
| 11,069,352 B1 * | 7/2021 | Tang ................ G06N 3/02 |

(Continued)

FOREIGN PATENT DOCUMENTS

| KR | 100732611 | 6/2007 |
| KR | 1020100073160 | 7/2010 |

(Continued)

OTHER PUBLICATIONS

PCT International Application No. PCT/KR2019/005887, Written Opinion of the International Searching Authority dated Feb. 12, 2020, 8 pages.

*Primary Examiner* — Huyen X Vo
*Assistant Examiner* — Athar N Pasha
(74) *Attorney, Agent, or Firm* — Lee Hong Degerman Kang & Waimey

(57) ABSTRACT

An embodiment of the present invention provides an artificial intelligence (AI) apparatus for recognizing a speech of a user, the artificial intelligence apparatus includes a memory to store a speech recognition model and a processor to obtain a speech signal for a user speech, to convert the speech signal into a text using the speech recognition model, to measure a confidence level for the conversion, to perform a control operation corresponding to the converted text if the measured confidence level is greater than or equal to a reference value, and to provide feedback for the conversion if the measured confidence level is less than the reference value.

8 Claims, 15 Drawing Sheets

(51) Int. Cl.
*G10L 15/26* (2006.01)
*G10L 25/30* (2013.01)

(56) References Cited

U.S. PATENT DOCUMENTS

| | | | |
|---|---|---|---|
| 2008/0243502 A1* | 10/2008 | Ativanichayaphong | ..................... G10L 15/193 704/240 |
| 2009/0150153 A1* | 6/2009 | Li | .......................... G10L 15/187 704/254 |
| 2013/0185066 A1* | 7/2013 | Tzirkel-Hancock | ......................... G10L 21/057 704/233 |
| 2015/0287413 A1 | 10/2015 | Jung et al. | |
| 2019/0013008 A1* | 1/2019 | Kunitake | ................. G10L 15/22 |
| 2019/0189113 A1* | 6/2019 | Hecht | .................... G10L 15/07 |
| 2019/0304442 A1* | 10/2019 | Hayashida | .............. G10L 15/20 |
| 2020/0043476 A1 | 2/2020 | Hwang | |
| 2020/0184966 A1* | 6/2020 | Yavagal | .................. G10L 15/30 |

FOREIGN PATENT DOCUMENTS

| | | |
|---|---|---|
| KR | 1020150116389 | 10/2015 |
| KR | 1020180096483 | 8/2018 |

\* cited by examiner

FIG. 5

| Feature | Reference Feature | Description |
|---|---|---|
| top1_tot_score | Top-Choice Total Score | Score (AM score/inverse_asoustic_weight+LM score) of Top-1 |
| top1_am_score | Top-Choice Total Acoustic Score | AM score of Top-1 |
| top1_lm_score | Top-Choice Total N-gram Score | LM score of Top-1 |
| diff_score_norm | Total Score Drop | Dividing difference in score between Top-1 and Top-2 by score of Top-1 and then dividing result by speech length (number of frames) |
| diff_am_score_norm | Acoustic Score Drop | Dividing difference in am_score between Top-1 and Top-2 by am_score of Top-1 and then dividing result by speech length (number of frames) |
| diff_lm_score_norm | Lexical Score Drop | Dividing difference in lm_score between Top-1 and Top-2 by lm_score of Top-1 and then dividing result by speech length (number of frames) |
| avg_post | Top-Choice Average Acoustic Score | Average of posterior values of Top-1 |
| avg_word_conf | - | Average of (use lattice-to-ctm-conf result value of kald) confidence in word unit |
| avg_word_lm_score | Top-Choice Average N-gram Score | Average of LM score (1-gram probability) for each word |
| top1_avg_purity | Top-Choice Average N-best Purity | Average value of N-best purity of each word of Top-1 |
| top1_high_purity | Top-Choice High N-best Purity | Proportion of word, which has N-best purity >0.5, in Top-1 words |
| Nbest_avg_purity | Average N-best Purity | Average value of N-best purity of all words of N-best |
| Nbest_high_purity | High N-best Purity: | Proportion of word, which has N-best purity >0.5, in all words of N-best |

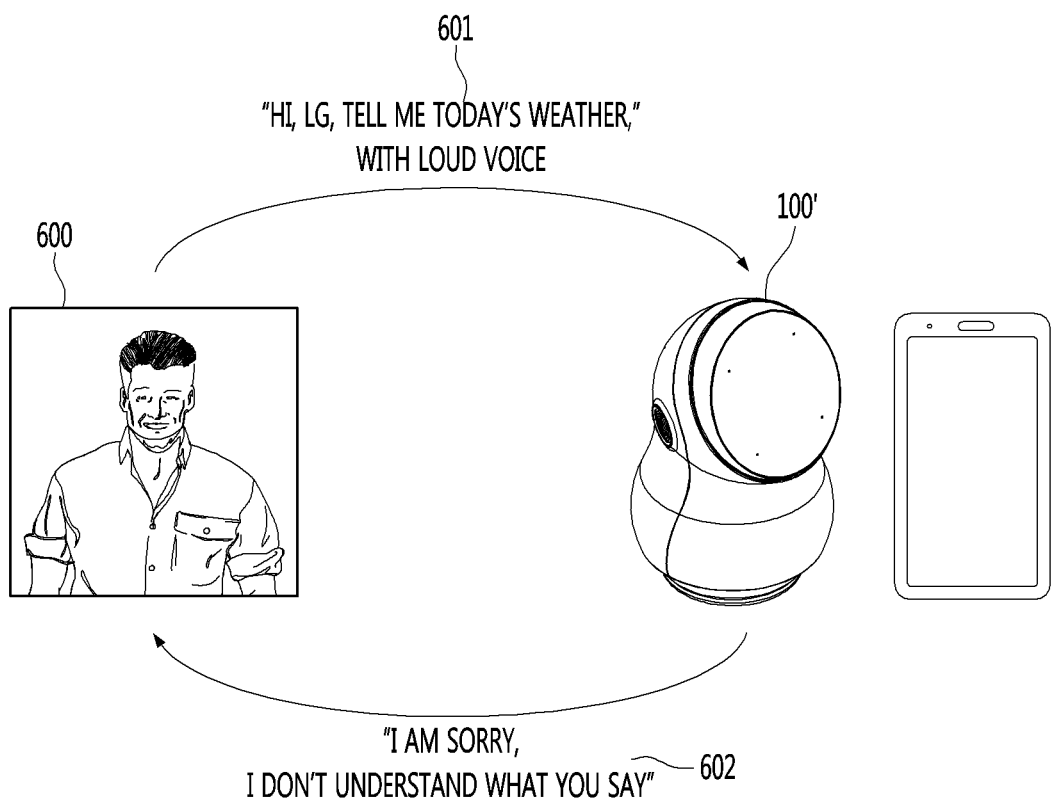

ARTIFICIAL INTELLIGENCE APPARATUS FOR RECOGNIZING SPEECH OF USER AND METHOD FOR THE SAME

CROSS-REFERENCE TO RELATED APPLICATIONS

This application is the National Stage filing under 35 U.S.C. 371 of International Application No. PCT/KR2019/005887, filed on May 16, 2019, the contents of which are hereby incorporated by reference herein in its entirety.

TECHNICAL FIELD

The present invention relates to an artificial intelligence (AI) apparatus for recognizing a user speech and a method for the sample. In more detail, the present invention relates to an AI apparatus for finding out a cause of lowering a confidence level and for providing feedback in the case that the confidence level in recognition is not sufficient when recognizing a speech signal for a user speech and a method for the same.

BACKGROUND ART

Recently, devices to perform a control operation by receiving an image or a sound have been increased. A self-driving device controls a motion appropriate to a situation by recognizing and analyzing the input data. Smartphones or security devices determine whether a user is registered by receiving an input of an image or a sound. Devices having speech recognition functions perform a control operation appropriate to the intention of a speech by recognizing and analyzing the speech.

However, currently, devices performing a control operation by receiving an image or a sound cannot determine whether input data is exactly and sufficiently recognized, and merely provide only feedback ("Please, re-enter") that the recognition is failed when the recognition is failed. Accordingly, the control operation capable of enhancing the confidence level in the recognition is not performed.

Accordingly, there is required a technology of performing a control operation to effectively enhance the recognition performance of data by analyzing the cause of lowering the confidence level in the recognition of data input thereafter.

PRIOR ART

Patent Document

[Patent Document 1] Korean Patent Registration No. 10-0923137

DISCLOSURE

Technical Problem

The present invention is to provide an AI apparatus for determining whether speech recognition is sufficiently achieved when a speech signal is input, for performing a control operation corresponding to a recognition result only when it is determined that the speech recognition is sufficiently achieved, and for providing feedback when the speech recognition is not sufficiently achieved, and a method for the same.

In addition, the present invention is to provide an AI apparatus for finding out a cause of lowering a confidence level when speech recognition is not sufficiently achieved and for providing feedback for a user and a method for the same.

Technical Solution

In order to accomplish the objects, according to one aspect of the present invention, there is provided an AI apparatus for measuring a confidence level for a speech recognition of a speech signal, for performing a control corresponding to the speech recognition result if the confidence level is greater than or equal to the predetermined value, and for providing a feedback of failure of the speech recognition if the confidence level is less than the predetermined value, and a method for the same.

According to another aspect of the present invention, there is provided an AI apparatus for analyzing a cause of lowering the confidence level in the speech signal, if the speech recognition is determined to be failed, and providing the feedback for the cause of lowering the confidence level, and for a method for the same.

Advantageous Effects

As described above, according to various embodiments of the present invention, when the speech signal is recognized, it is determined whether the recognition is exactly performed, in advance. The control operation may be performed only when the speech recognition is exactly achieved, thereby preventing an inaccurate control operation resulting from erroneous speech recognition.

In addition, according to various embodiments of the present invention, since a cause of lowering the confidence level is fed back to a user when the speech recognition is not exactly performed, the user may detect the cause of preventing sufficient recognition, thereby improving the recognition rate.

DESCRIPTION OF DRAWINGS

FIG. 5 is a view illustrating a plurality of features constituting the recognition feature set according to an embodiment of the present invention.

FIG. 6 is a view illustrating an operation of a conventional speech recognition device when the conventional speech recognition device fails in speech recognition.

BEST MODE

Mode for Invention

Figure 1:
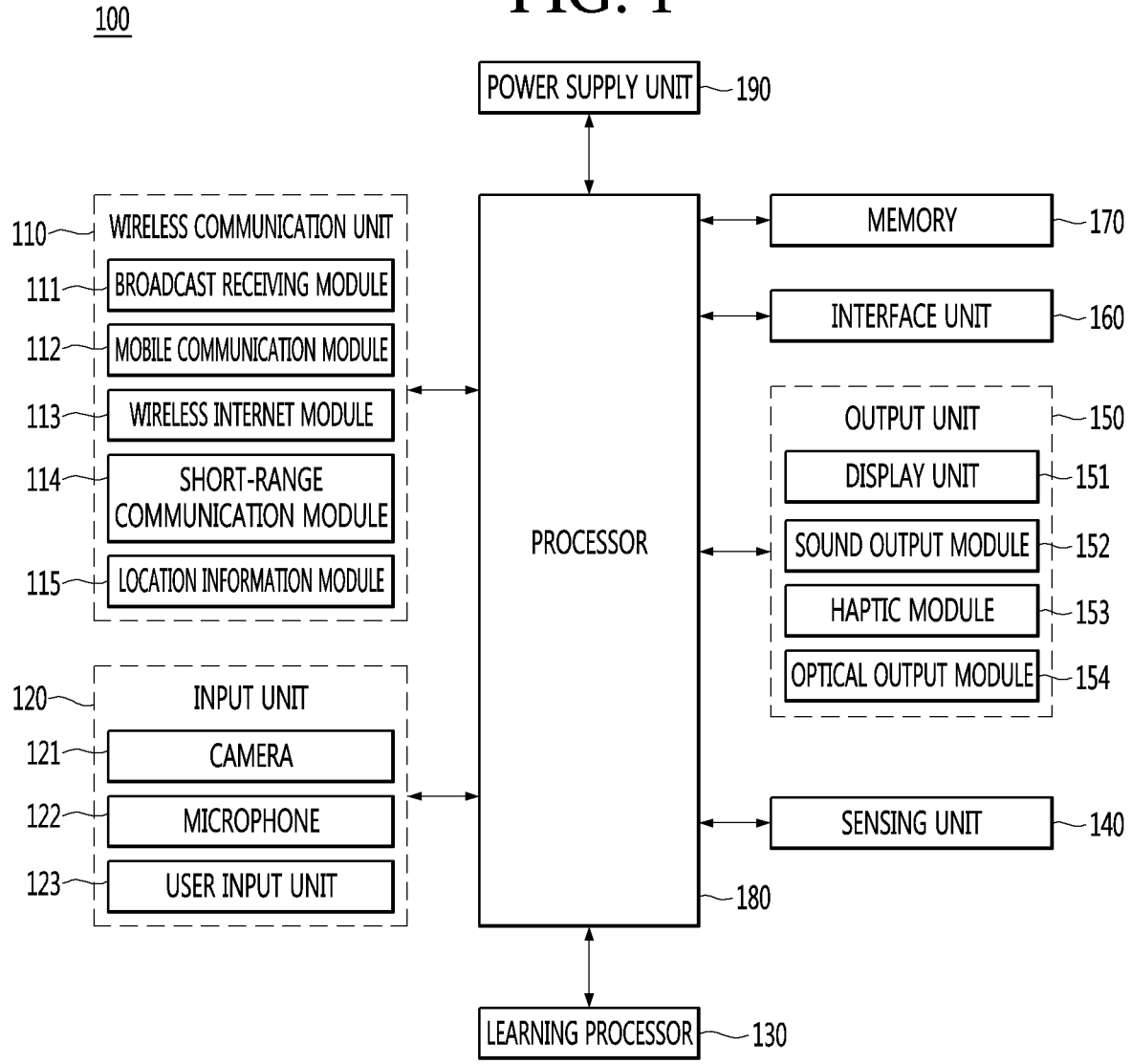
FIG. 1 is a block diagram illustrating a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks are configured with an input layer and an output layer.

Moreover, general multilayer neural networks are configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be learned by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN learned based on training data may classify or cluster input data, based on a pattern of the input data.

In this specification, an ANN learned based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be learned in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be learned by receiving and using data which does not deceive the discriminator, and the discriminator may be learned by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of a terminal 100 according to an embodiment of the present invention.

Hereinafter, the terminal 100 may be named an artificial intelligence (AI) apparatus 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
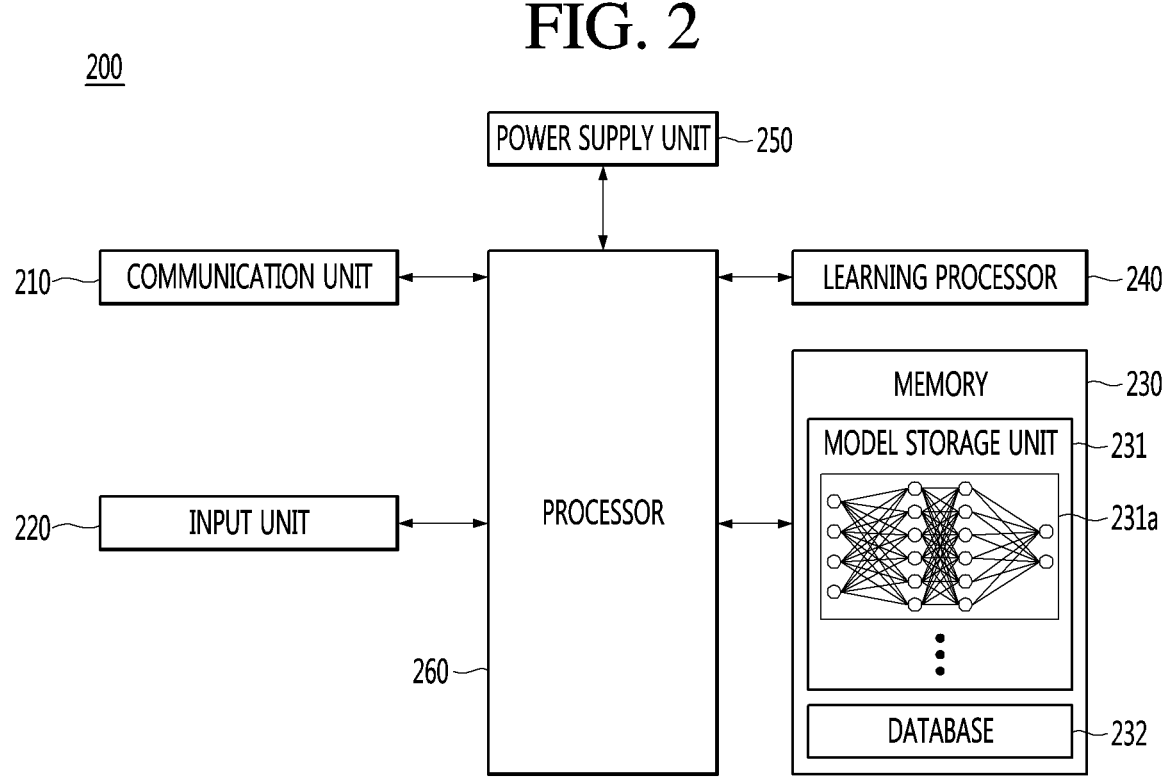
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
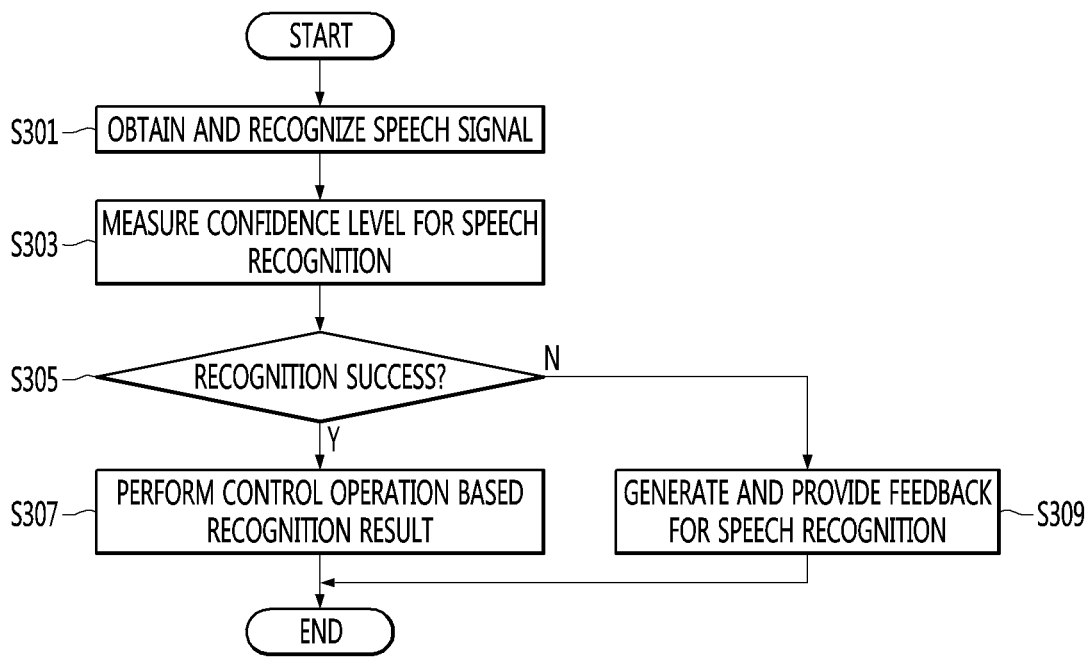
FIG. 3 is a flowchart illustrating a method for recognizing a user speech according to an embodiment of the present invention.

FIG. 3 is a flowchart illustrating a method for recognizing a user speech according to an embodiment of the present invention.

Referring to FIG. 3, the processor 180 of the AI apparatus 100 obtains a speech signal for a user speech and converts the speech signal into a text using the speech recognition model (S301).

The speech signal, which is obtained by converting a sound wave including the user speech into a digital signal, may be generated through the microphone 122 of the AI apparatus 100 or an external microphone.

The speech signal may be an audio file in a pulse code modulation (PCM) format.

The processor 180 may recognize the speech signal and may convert the speech signal to the text.

The processor 180 may convert the speech signal to the text using a speech recognition model.

Recognizing the speech signal may refer to converting the speech signal to the text.

The speech recognition model may refer to a Speech-To-Text (STT) engine.

The speech recognition model may be stored in the memory 170.

The processor 180 of the AI apparatus 100 measures a confidence level for speech recognition (S303).

The confidence level in speech recognition may refer to the confidence level in converting the speech signal to the text.

The confidence level may indicate a numerical value representing a success extent of the recognition of the speech signal or may indicate a numeric value representing the success state of the exact recognition (conversion) of the input speech signal.

For example, the confidence level may be expressed as a numeric value in the continuous range of [0,1] or [0%, 100%] when expressed as a confidence value, but may be expressed only as a value of '0' or '1' when expressed as a value representing the success state of the recognition.

The processor 180 of the AI apparatus 100 determines the success state of the speech recognition of the input speech signal (S305).

When the confidence level has a continuous value as a confidence value, the processor 180 may determine the success of the speech recognition by determining whether the confidence level is equal to or greater than a preset reference value.

When the confidence level is expressed as a value representing the success of the recognition, the processor 180 may determine the success state of the speech recognition succeeds by determining whether the confidence level is '1'.

The processor 180 may determine the success state of the speech recognition by determining whether the confidence level is '1', regardless of the type of the confidence level.

If it is determined that the processor 180 succeeds in the speech recognition, according to the determination in step S305, the processor 180 obtains intention information of a character string generated as a recognition result and performs a control operation corresponding to the obtained intention information (S307).

If the processor 180 succeeds in speech recognition, the processor 180 performs a control operation based typical speech recognition.

The processor 180 may perform a control operation based on speech recognition and may provide a result from the speech recognition or feedback corresponding to the control operation based on the speech recognition.

According to another embodiment, the intention information of the generated character string may be obtained from an external speech server (not illustrated) or the learning device 200 instead of the processor 180 of the AI apparatus 100. The AI apparatus 100 may receive the intention information obtained through the wireless communication unit 110.

If it is not determined that the processor 180 succeeds in speech recognition according to the determination in step S305, the processor 180 generates and provides feedback for speech recognition (S309).

The feedback for the speech recognition may be generated based on at least one of a confidence level or a recognition result.

The feedback for the speech recognition may include at least one of feedback for notifying a cause of lowering the confidence level, feedback for notifying the cause of lowering the confidence level while suggesting the enhancement of the confidence level, feedback for notifying a recognition result for some of a speech signal subject to successful speech recognition, or feedback for notifying an estimation result of the intention information of the speech signal based on the speech recognition result.

For example, the feedback for notifying the cause of lowering the confidence level may include feedback notifying that the recognition is not performed well due to a lot of surrounding noise, feedback for notifying that the voice level is lower, so recognition is not performed well, feedback for notifying the speech is very fast, so the recognition is not performed well, feedback for notifying that voices of several persons are simultaneously input, so the recognition is not performed well.

For example, the feedback for notifying the cause of lowering the confidence level while suggesting the enhancement of the confidence level may include feedback for suggesting the speech under an environment having less noise as the recognition is not performed well due to a lot of surrounding noise, feedback for suggesting the speech with louder voice as the voice level is lower, so recognition is not performed well, feedback for suggesting the speech at a slower speech speed as the speech is very fast, so the recognition is not performed well, or feedback for suggesting that a user makes a speech alone as voices of several persons are simultaneously input, so the recognition is not performed well.

For example, the feedback for notifying the recognition result for some of a speech signal subject to successful speech recognition may include feedback for providing a character string generated with respect to a portion of the speech signal, which is subject to the successful speech recognition. In other words, in the case that the input speech signal is "call Jonathan", and that only "Jonathan" is subject to the successful speech recognition, the processor 180 may generate and provide feedback of "only "Jonathan" is recognized".

For example, the feedback for notifying an estimation result of the intention information of the speech signal based on the speech recognition result may include feedback for providing the result obtained by predicting the user intention from a portion of the speech signal, which is subject to the successful speech recognition. In other words, in the case that the input speech signal is "call Jonathan", and only "call Jo??" is recognized due to noise, the processor 180 may generate and provide feedback such as "call Jonathan?" or "call John?"

The feedback provided by the processor 180 may be output in the form of image information through the display unit 151, may be output in the form of speech through the sound output module 152, or may be output to the external terminal through the wireless communication unit 110.

According to another embodiment, the feedback may be generated by an external feedback generating device (not illustrated) or the learning server 200 instead of the processor 180 of the AI apparatus 100 and the AI apparatus 100 may receive the generated feedback through the wireless communication unit 110

Figure 4:
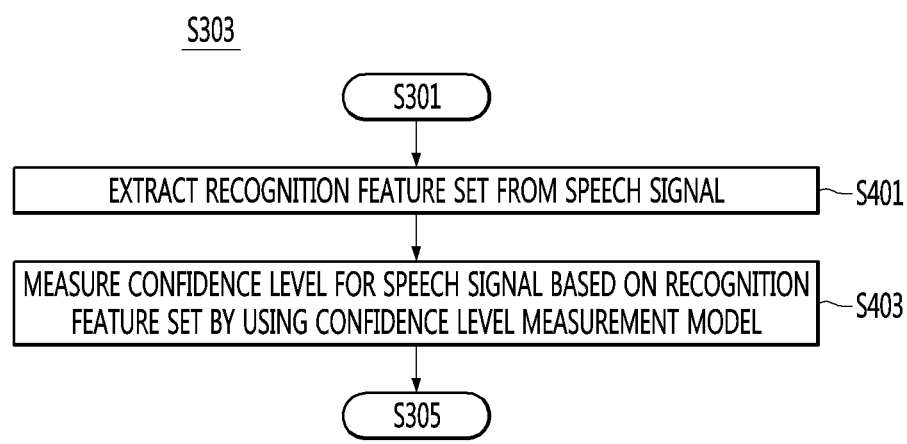
FIG. 4 is a flowchart illustrating an example of a step S303 of measuring a confidence level for the speech recognition illustrated in FIG. 3.

FIG. 4 is a flowchart illustrating an example of a step S303 of measuring a confidence level for the speech recognition illustrated in FIG. 3.

Referring to FIG. 4, the processor 180 of the AI apparatus 100 extracts a recognition feature set from the speech signal (S401).

The recognition feature set may include a plurality of features for determining the confidence level for the speech recognition.

The processor 180 of the AI apparatus 100 measures the confidence level for the speech signal based on the recognition feature set by using the confidence level measurement model (S403).

The confidence level may be expressed as a numeric value in the continuous range of [0,1] or [0%, 100%] when expressed as a confidence value, but may be expressed only as a value of '0' or '1' when expressed as a value representing the success of the recognition.

Here, the confidence level may refer to a confidence level for the speech recognition model used to recognize the speech signal.

The value of the confidence level may refer to a proportion (successful recognition proportion) of the speech signal subject to successful recognition, and the successful recognition proportion may be calculated in various manners based on a proportion in a word unit, a proportion in a time unit, or a proportion in a syllable unit.

For example, on the assumption that eight words are exactly recognized when a speech signal including 10 words is input, the value of the confidence level may be expressed as 80% or 0.8.

The value representing the success of the recognition may refer to whether the input speech signal is exactly recognized and may refer to whether the successful recognition proportion of the speech signal is equal to or greater than a predetermined reference value.

For example, the value representing the success of the recognition may have '1' only if the entire portion of the input speech signal is exactly recognized, or may have '1' if 90% or more of the input speech signal is exactly recognized.

The confidence level measurement model may be a model implemented with an artificial neural network.

The confidence level measurement model may be learned to infer the value of a confidence level labeled on a training speech signal or the value representing the success of the recognition, when the recognition feature set extracted from the training speech signal is input.

If a speech signal is input, the confidence level measurement model may output, as a result, a confidence level for the input speech signal, or the value representing the success of the recognition.

For example, when a first training speech signal is subject to successful speech recognition through the speech recognition model, a value of '1' representing the successful recognition may be labeled on the first speech signal. In addition, in the confidence level measurement model, model parameters may be trained such that the value representing the success of the recognition is output as '1' when the first training speech signal is input.

To the contrary, when a second training speech signal is failed in speech recognition through the speech recognition model, a value of '0' representing the failed recognition may be labeled on the second speech signal. In addition, in the confidence level measurement model, the model parameters may be trained such that the value representing the success of the recognition is output as '0' when the second speech signal is input.

The confidence level measurement model may be learned by the processor 180 of the AI apparatus 100 or the learning processor 240 of the learning device 200.

The confidence level measurement model may be stored in the memory 170.

According to another embodiment, the processor 180 may transmit the input speech signal or the extracted recognition feature set to the learning device 200 through the wireless communication unit 110 and may receive the value of the confidence level measured using the confidence level measurement model from the learning device 200.

FIG. 5 is a view illustrating a plurality of features constituting the recognition feature set according to an embodiment of the present invention.

The recognition feature set may include at least one of top1_tot_score, top1_am_score, top1_lm_score, diff_score_norm, diff_am_score_norm, diff_lm_score_norm, avg_post, avg_word_conf, avg_word_lm_score, top1_avg_purity, top1_high_purity, or Nbest_avg_purity, Nbest_high_purity The feature 'top1_tot_score' is the score of 'top-1', wherein the score may be calculated as in following Equation 1.

$$\text{score} = \text{AM score}/\text{inverse\_acoustic\_weight} + \text{LM score} \qquad \text{Equation 1}$$

The feature 'top1_am_score' may refer to the AM score of 'top-1', and the AM score may refer to an acoustic score.

The feature 'top1_lm_score' is the LM score of 'top-1', wherein the LM score may refer to a language score.

Wherein the LM score may refer to an N-gram score.

The feature 'diff_score_norm' may refer to a value obtained by dividing the difference between the score 'top1_tot_score' of 'top-1' and the score 'top2_tot_score' of 'top-2' by 'top1_tot_score' of 'top-1' and then dividing the resultant value by a vocal length (for example the number of frames) as in following Equation 2.

$$\text{diff\_score\_norm} = (1 - \text{top2\_tot\_score}/\text{top1\_tot\_score})/(\text{frame}) \qquad \text{Equation 2}$$

The feature 'diff_am_score_norm' may refer to a value obtained by dividing the difference between the am' score (top1_am_score) of top 1 and the 'am' score (top2_am_score) of top 2 by the 'am' sore (top 1_am_score) of top 1 and by dividing the resultant value by a speech length (for example, the number of frames) as in Following Equation 3.

$$\text{diff\_am\_score\_norm} = (1 - \text{top2\_am\_score}/\text{top1\_am\_score})/(\text{frame}) \qquad \text{Equation 3}$$

The feature 'diff_lm_score_norm' may refer to a value obtained by dividing the difference between the 'lm' score (top1_lm_score) of top 1 and the 'am' score (top2_lm_score) of top 2 by the 'am' sore (top1_lm_score) of top 1 and by dividing the resultant value by a speech length (for example, the number of frames) as in Following Equation 4.

$$\text{diff\_lm\_score\_norm} = (1 - \text{top2\_lm\_score}/\text{top1\_lm\_score})/(\text{frame}) \qquad \text{Equation 4}$$

The feature 'avg_post' may refer to an average of posterior values of top 1.

The feature 'avg_word_conf' may refer to an average of confidence levels in a word unit.

Here, the confidence level in the word unit may employ the result value of 'lattice-to-ctm-conf'.

The feature 'avg_word_lm_score' may refer to an average of LM scores of each word, and the LM score of each word may refer to the '1-gram' probability.

The feature 'top1_avg_purity' may refer to the average value of an N-best purity of each word.

The feature 'top1_high_purity' may refer to the proportion of words, which has the N-best purity greater than 0.5, of words of top 1.

The feature 'Nbest_avg_purity' may refer to an average value for N-best purities of all N-best words.

The feature 'Nbest_high_purity' may refer to the proportion of words, which has the N-best purity greater than 0.5, of N-best words.

FIG. 6 is a view illustrating an operation of a conventional speech recognition device 100' when the conventional speech recognition device 100' fails in speech recognition.

Figure 7:
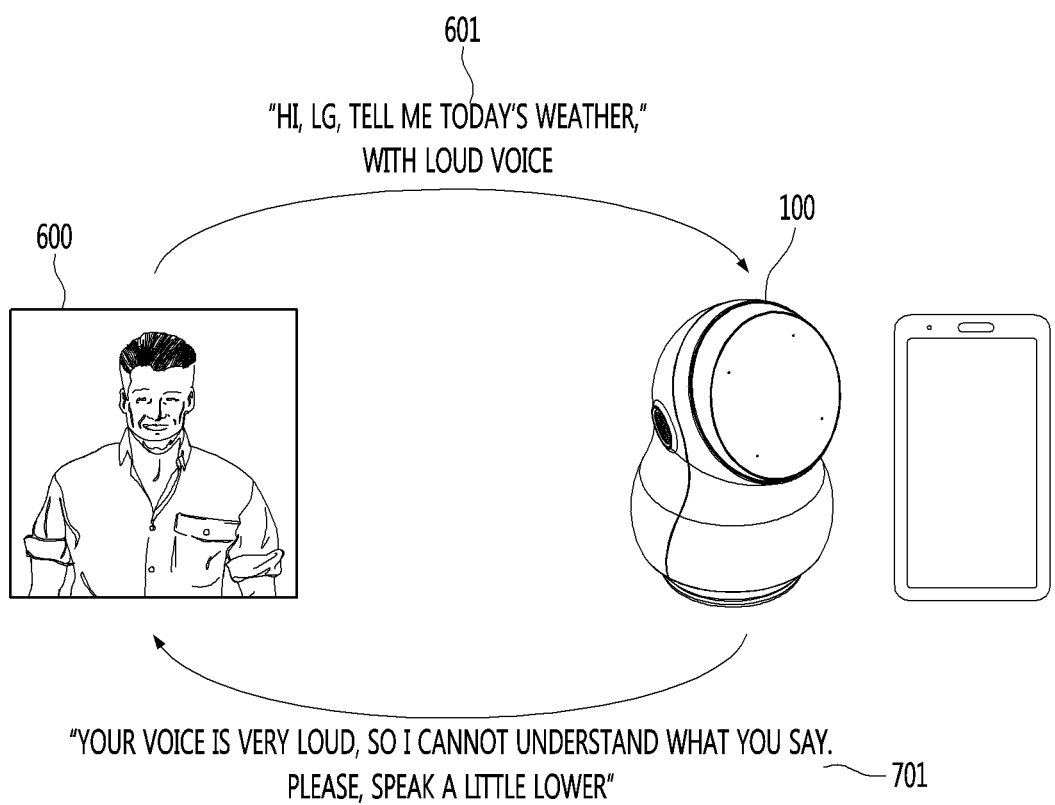
FIG. 7 is a view illustrating an operation of a speech recognition device according to an embodiment of the present invention when the speech recognition device fails in speech recognition.

FIG. 7 is a view illustrating an operation of a speech recognition device 100 according to an embodiment of the present invention when the speech recognition device 100 fails in speech recognition.

In FIGS. 6 and 7, it is assumed that although a user 600 has uttered 601, like "Hi, LG, tell me today's weather," the voice of the user 600 is too loud, so the speech recognition device 100 and the conventional speech recognition device 100' fail in speech recognition.

Referring to FIG. 6, the convention speech recognition device 100' may provide "I am sorry, I don't understand what you say" as feedback for merely notifying the failure of the speech recognition (602).

Referring to FIG. 7, according to an embodiment of the present invention, the AI apparatus 100 provides "Your voice is very loud, so I cannot understand what you say. Please, speak a little lower" as feedback of notifying a cause of the failure of the speech recognition and overcoming the cause (701).

Figure 8:
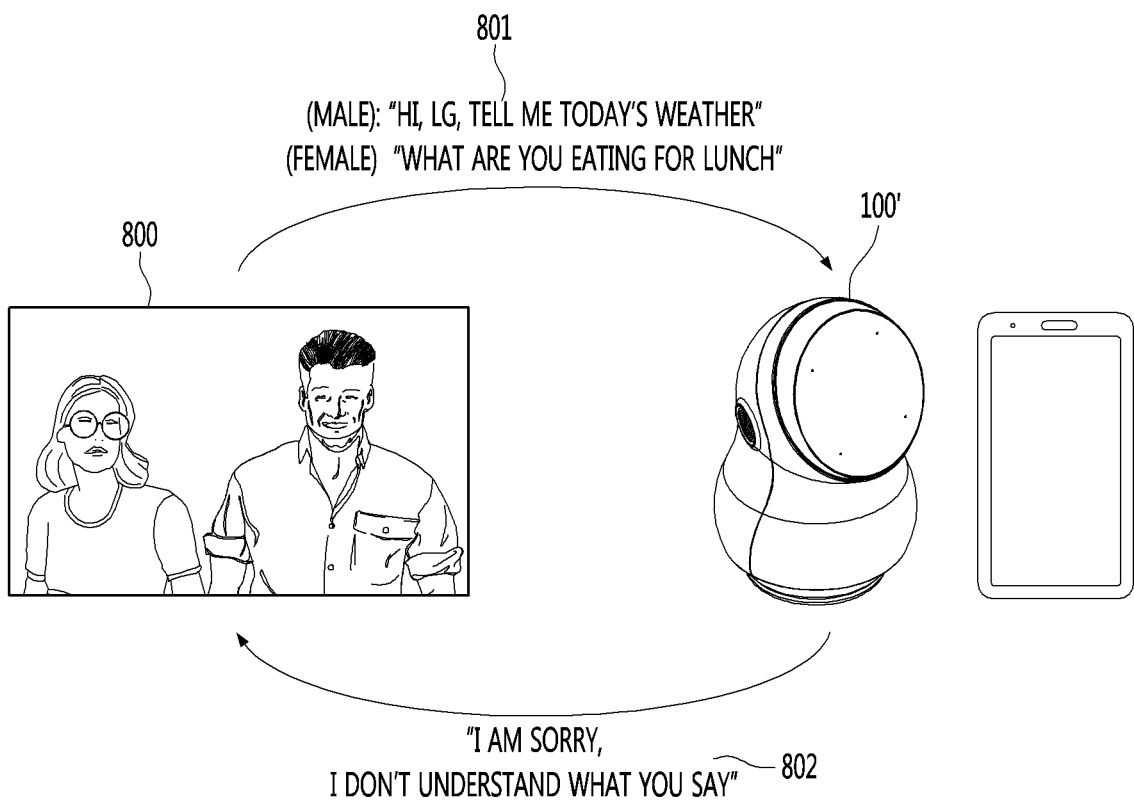
FIG. 8 is a view illustrating the operation of the conventional speech recognition device when the conventional speech recognition device fails in speech recognition.

FIG. 8 is a view illustrating the operation of the conventional speech recognition device 100' when the conventional speech recognition device 100' fails in speech recognition.

Figure 9:
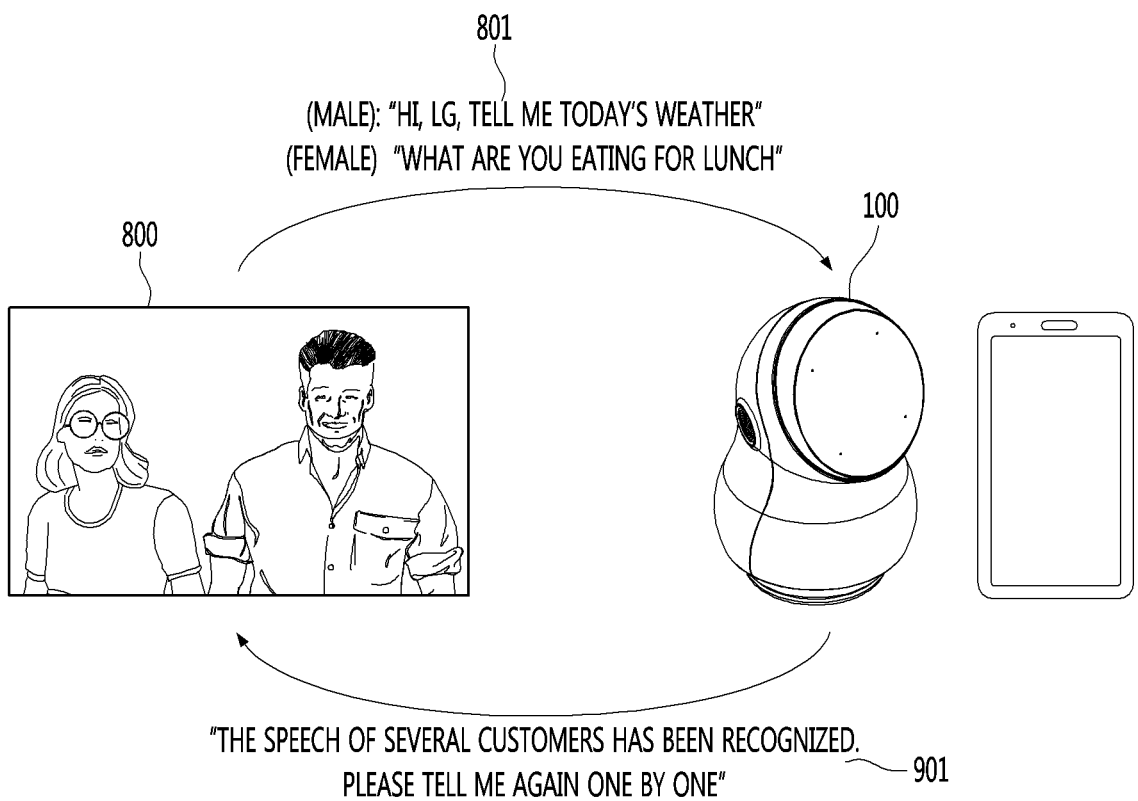
FIG. 9 is a view illustrating an operation of the speech recognition device according to an embodiment of the present invention when the speech recognition device fails in speech recognition.

FIG. 9 is a view illustrating an operation of the speech recognition device 100 according to an embodiment of the present invention when the speech recognition device 100 fails in speech recognition.

In FIGS. 8 and 9, it is assumed that although a plurality of users 800 have simultaneously uttered 801, like "Hi, LG, tell me today's weather," and "What are you eating for lunch", so the speech recognition device 100 and the conventional speech recognition device 100' fail in speech recognition.

Referring to FIG. 8, the convention speech recognition device 100' may provide "I am sorry, I don't understand what you say" as feedback for merely notifying the failure of the speech recognition (802).

Referring to FIG. 9, according to an embodiment of the present invention, the AI apparatus 100 provides "The speech of several customers has been recognized. Please tell me again one by one" as feedback of notifying a cause of the failure of the speech recognition and overcoming the cause (901).

Figure 10:
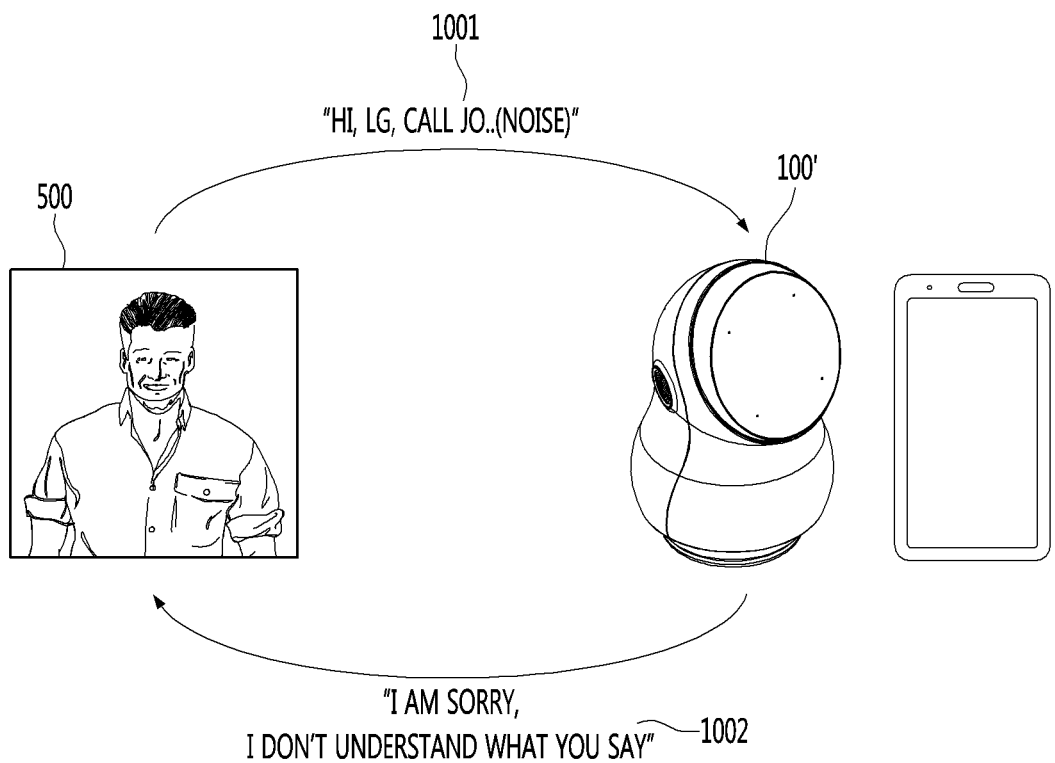
FIG. 10 is a view illustrating the operation of the conventional speech recognition device when the conventional speech recognition device fails in speech recognition.

FIG. 10 is a view illustrating the operation of the conventional speech recognition device 100' when the conventional speech recognition device 100' fails in speech recognition.

Figure 11:
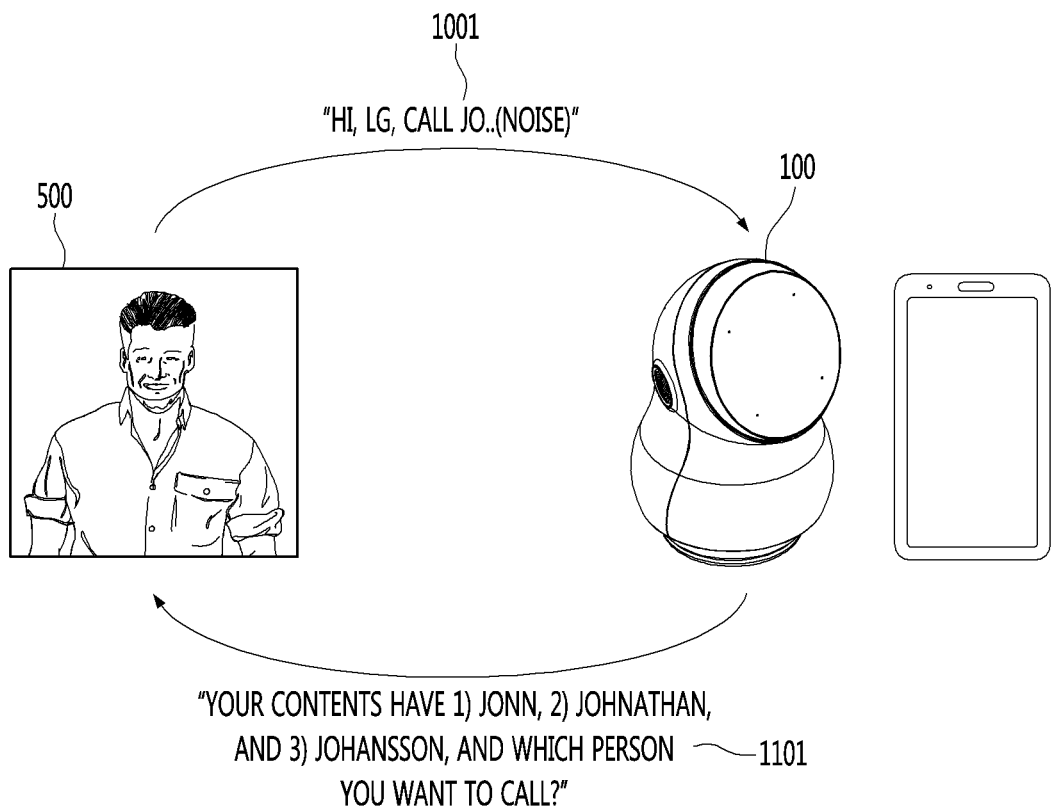
FIG. 11 is a view illustrating an operation of the speech recognition device according to an embodiment of the present invention when the speech recognition device fails in speech recognition.

FIG. 11 is a view illustrating an operation of the speech recognition device 100 according to an embodiment of the present invention when the speech recognition device 100 fails in speech recognition.

In FIGS. 10 and 11, it is assumed that although the user 600 has uttered 1001, like "Hi, LG, call Jo . . . (noise)", so the speech recognition device 100 and the conventional speech recognition device 100' fail in speech recognition due to the noise.

Referring to FIG. 10, the convention speech recognition device 100' may provide "I am sorry, I don't understand what you say" as feedback for merely notifying the failure of the speech recognition (1002).

Referring to FIG. 11, according to an embodiment of the present invention, the AI apparatus 100 provides "Your contents have 1) Jonn, 2) Johnathan, and 3) Johansson, and which person you want to call?" as feedback of providing intention information of the user, which is inferred based on information on successful speech recognition (1101).

Figure 12:
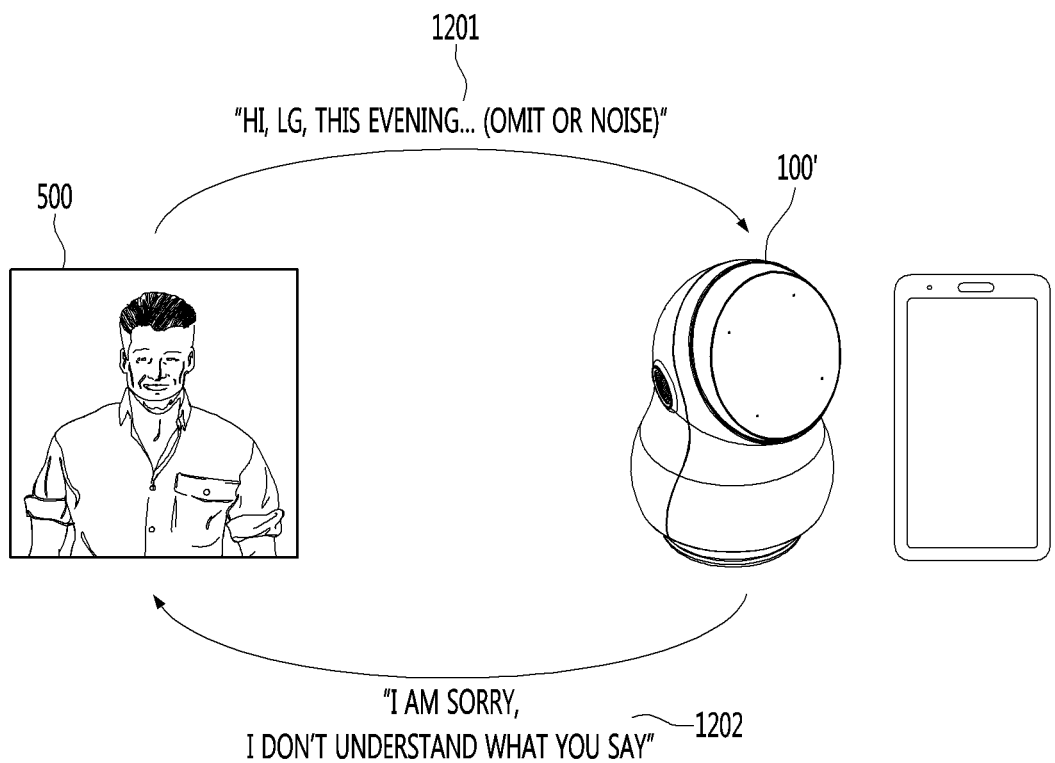
FIG. 12 is a view illustrating the operation of the conventional speech recognition device when the conventional speech recognition device fails in speech recognition.

FIG. 12 is a view illustrating the operation of the conventional speech recognition device 100' when the conventional speech recognition device 100' fails in speech recognition.

Figure 13:
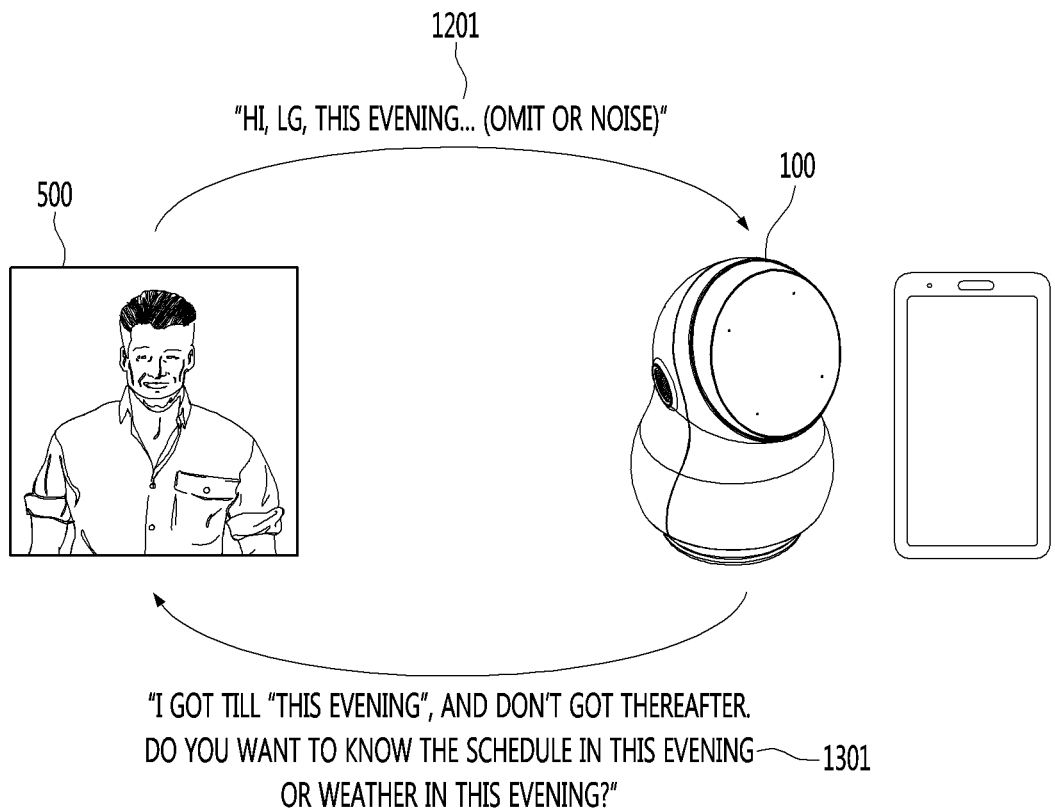
FIG. 13 is a view illustrating an operation of the speech recognition device according to an embodiment of the present invention when the speech recognition device fails in speech recognition.

FIG. 13 is a view illustrating an operation of the speech recognition device 100 according to an embodiment of the present invention when the speech recognition device 100 fails in speech recognition.

In FIGS. 12 and 13, it is assumed that although the user 600 has uttered 1201, like "Hi, LG, this evening . . . (omit or noise)", so the speech recognition device 100 and the conventional speech recognition device 100' fail in speech recognition due to the noise.

Referring to FIG. 12, the convention speech recognition device 100' may provide "I am sorry, I don't understand what you say" as feedback for merely notifying the failure of the speech recognition (1202).

Referring to FIG. 13, according to an embodiment of the present invention, the AI apparatus 100 provides "I got till "this evening", and don't got thereafter. Do you want to know the schedule in this evening or weather in this evening?" as feedback of providing intention information of the user, which is inferred based on information on successful speech recognition (1301).

Figure 14:
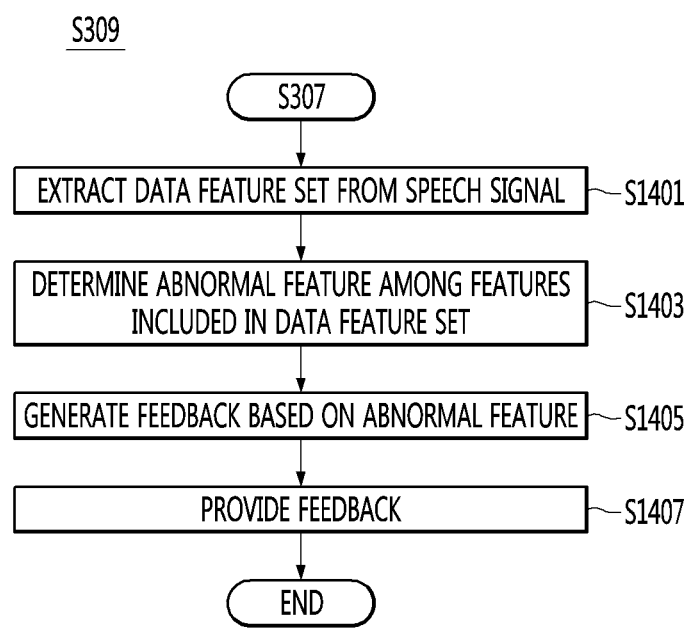
FIG. 14 is a flowchart illustrating an example of a step S309 of generating and providing feedback for speech recognition illustrated in FIG. 3.

FIG. 14 is a flowchart illustrating an example of a step S309 of generating and providing feedback for speech recognition illustrated in FIG. 3.

Referring to FIG. 14, the processor 180 of the AI apparatus 100 extracts a data feature set from the speech signal (S1401).

The data feature set may include a plurality of features exerting an influence on the speech signal.

The data feature set include at least one of a single voice source state, a speech level at least one of a single voice source state, a speech level, a noise level, a signal to noise ratio (SNR), a speech speed, a word number, a word length, a clipping existence state, or a clipping ratio.

The processor 180 may detect a voice section through Voice Activity Detection (VAD) from the speech signal and may extract the data feature set from the detected voice section.

The single voice source state may refer a feature indicating whether the input speech signal includes the speech of only one person or speeches of a plurality of persons.

The single voice source state may be determined using a voice source analyzing model.

The voice source analyzing model may output the single voice source state when a speech signal is input. For example, the voice source analyzing model may output the value of '1' when the input speech signal is generated from a single voice source and may output the value of '0' when the input speech signal is generated from a plurality of voice sources, and vice versa.

The voice source analyzing model which includes the artificial neural network and may be learned through a machine learning scheme.

The voice source analyzing model may be learned by using the speech signal and label information indicating whether the speech signal is generated from the single voice source.

For example, in the voice source analyzing model including the artificial neural network, model parameters may be learned to output the value representing a plurality of voice sources when the speech signal generated from the plurality of voice sources is input. Similarly, in the voice source analyzing model including the artificial neural network, the model parameters may be learned to output a value representing a single voice source when the speech signal generated from the single voice source is input.

The processor 180 may extract the speech level, the noise level or the SNR by using a result obtained by changing the speech signal in a dB scale and normalizing the speech signal.

The processor 180 may extract a peak SNR (PSNR) instead of the SNR.

The word number may refer to the number of words included in the speech signal.

The word length may refer to the length of each word or the length of all words included in the speech signal and may be expressed in a time unit or a frame unit.

The speech speed as the criterion representing the rapid degree of the speech may be expressed the number of words per speech time.

The speech speed may include the speech speed of the whole speech signal or the speech speed in a syllable unit.

The clipping existence represents whether a clipping phenomenon is present in the speech signal, and the clipping ratio may represent the proportion of the section of the speech signal having the clipping phenomenon, based on the whole section of the speech signal.

The clipping may refer to the distortion caused as the input speech signal deviates from the allowable output range of the AI apparatus 100.

The processor 180 determines an abnormal feature among at least one of features included in a data feature set extracted using the abnormal feature determination model (S1403).

When the processor 180 determines, as the abnormal feature, at least one of features included in the data feature set, the processor 180 may generate cause information of the abnormal feature together with the abnormal feature.

For example, when the speech speed is determined as the abnormal feature, the cause information represent whether the speech speed is very slow or very fast.

The feature, which is not determined as the abnormal feature, of the features included in the data feature set may be referred to as a normal feature.

The abnormal feature determination model may be learned using the training speech signal labeled thereon with the success state of the speech recognition.

In detail, as the data feature set is extracted from the training speech signal, the corresponding relationship between the data feature set and the success state of the speech recognition is obtained with respect to each training speech signal. In addition, the abnormal feature determination model is learned using a plurality of data feature sets and the success states of the speech recognition corresponding to the plurality of data feature sets.

The abnormal feature determination model may include a range information or threshold information used to determine the success state of the speech recognition with respect to each of feature included in the data feature set.

In the abnormal feature determination model, the range information used to determine the success state of the speech recognition may refer to information on an abnormal range and a normal range.

In the abnormal feature determination model, the threshold information may refer to information on a threshold value used to distinguish between an abnormal range and a normal range.

The abnormal range may refer to the range of each feature, which causes the failure in the speech recognition.

The normal range, which has the concept opposite to that of the abnormal range, may refer to the range of each feature, which causes the success in the speech recognition.

In the abnormal feature determination model, the threshold range may refer to the normal range.

The abnormal feature determination model may include rank information of each feature, and each feature is higher as an influence exerted on the confidence level is higher.

The abnormal feature determination model may include at least one normal range or abnormal range for features constituting the data feature set. In other words, even one feature may have at least one normal range or abnormal range.

For example, a first normal range, . . . , an $n^{th}$ normal range, or a first abnormal range, . . . , and a $m^{th}$ normal range may be present with respect to one feature.

The abnormal feature determination model may include rank information on each normal range or each abnormal range, and each normal range or each abnormal range may have a higher rank as the influence exerted on the confidence level is higher.

For example, it is assumed that the higher influence is exerted on the confidence level in order of a first normal range for the speech level, a first normal range for the noise level, and a second normal range for the speech level. In this case, the first normal range for the speech level is set to have the first rank, the first normal range for the noise level is set to have the second rank, and the second normal range for the speech level is set to have the third range.

The abnormal feature determination model, which constitutes the artificial neural network, may be learned in a machine learning algorithm or a deep learning algorithm. Alternatively, the abnormal feature determination model may be formed in the decision tree and thus may be learned through decision tree learning.

The processor 180 may obtain abnormal range information or a normal range information with respect to each of features included in the data feature set, based on the abnormal feature determination model. Accordingly, the feature, which belongs to the corresponding abnormal range, of features included in the data feature set may be determined as an abnormal feature Alternatively, to the contrary, the processor 180 may obtain normal range information with respect to each of features included in the data feature set, based on the abnormal feature determination model. Accordingly, the feature, which does not belong to the corresponding normal range, of features included in the data feature set may be determined as normal feature.

For example, if the speech recognition succeeds when the speech speed has a value between 0 and 5 among the features, and the speech recognition fails when the speech speed has a value other than that, the normal range may refer to the range of 0 to 5, and the abnormal range may refer to other ranges. This is provided for illustrative purpose. Actually, a plurality of normal ranges and a plurality of abnormal ranges may be provided to one feature.

Further, the processor 180 may calculate an abnormal degree based on an extent that each feature deviates from the normal range, by using the abnormal feature determination model. In addition, the rank between abnormal features may be determined based on the abnormal degree, and the feedback may be generated based on the rank between the abnormal features.

For example, it is assumed that a lot of noise is included in the speech signal to exert the highest influence on lowering a recognition ratio, the fast speech speed of the user exerts the second highest influence on lowering the recognition ratio, and the noise and the speech speed are determined as abnormal features.

In this case, the processor 180 may determine noise as an abnormal feature having the first rank or more and the speech speed as an abnormal feature having a second rank or more. In addition, the processor 180 may generate feedback including information on that the noise and the speech speed are both determined as abnormal features and information on that the noise is a feature having a rank higher than the rank of the speech speed.

The processor 180 may determine the rank between abnormal features by comparing the normalized sizes of abnormal extents.

For example, it is assumed that the normal range of the first abnormal feature is [0, 10], the normal range of the second abnormal feature is [0, 20], the value of the first abnormal feature is 15, and the value of the second abnormal feature is 25. Assume the case is 25. In this case, the first abnormal feature and the second abnormal feature have the same abnormal extent of '5'. However, since the normalized abnormal extent of the first abnormal feature is higher than the normalized abnormal extent of the second abnormal feature, the first abnormal feature may be determined as the abnormal feature having the first rank or more.

Although the processor 180 normalizes the abnormal extent based on the normal range or the threshold range, the processor 180 may normalize the abnormal extent based on the whole range of values allocable to the abnormal feature.

The abnormal feature determination model may be learned by the processor 180 of the AI apparatus 100 or the learning processor 240 of the learning device 200.

The abnormal feature determination model may be stored in the memory 170.

According to another embodiment, the processor 180 may transmit the input speech signal or the extracted data feature set to the learning device 200 through the wireless communication unit 110. In addition, the processor 180 may receive information on abnormal features classified based on the abnormal feature determination model from the learning device 200 through the wireless communication unit 110.

The processor 180 predicts and generates intention information on an input speech signal based on a word class, with respect to an incomplete character string generated according to speech recognition.

When the processor 180 predicts intention information, the processor 180 may predict a complete character string based on the incomplete character string using the language model learned through the artificial neural network, and may predict intention information from the complete character string.

The processor 180 may predict the intention information by proving a higher weight to a noun.

Here, the learning model may be a recurrent neural network (RNN)-based long short term memory (LSTM) model.

The processor 180 generates the feedback based on the abnormal feature (S1405).

The feedback may include at least one of a notification of the abnormal feature or a suggestion of a behavior of removing the abnormal feature.

For example, in the case that the speech speed is fast, the speech speed is classified as the abnormal feature, the processor 180 may generate feedback including at least one of content that the processor 180 fails in the speech recognition as the speech speed is fast or a suggestion that the speech has to be slow down as the speech speed is fast.

The feedback may include content of providing predicted intention information for the input speech signal.

For example, the processor 180 may generate feedback including intention information predicted according to the incomplete speech recognition or examples of the predicted intention information.

The processor 180 provides the generated feedback (S1407).

Figure 15:
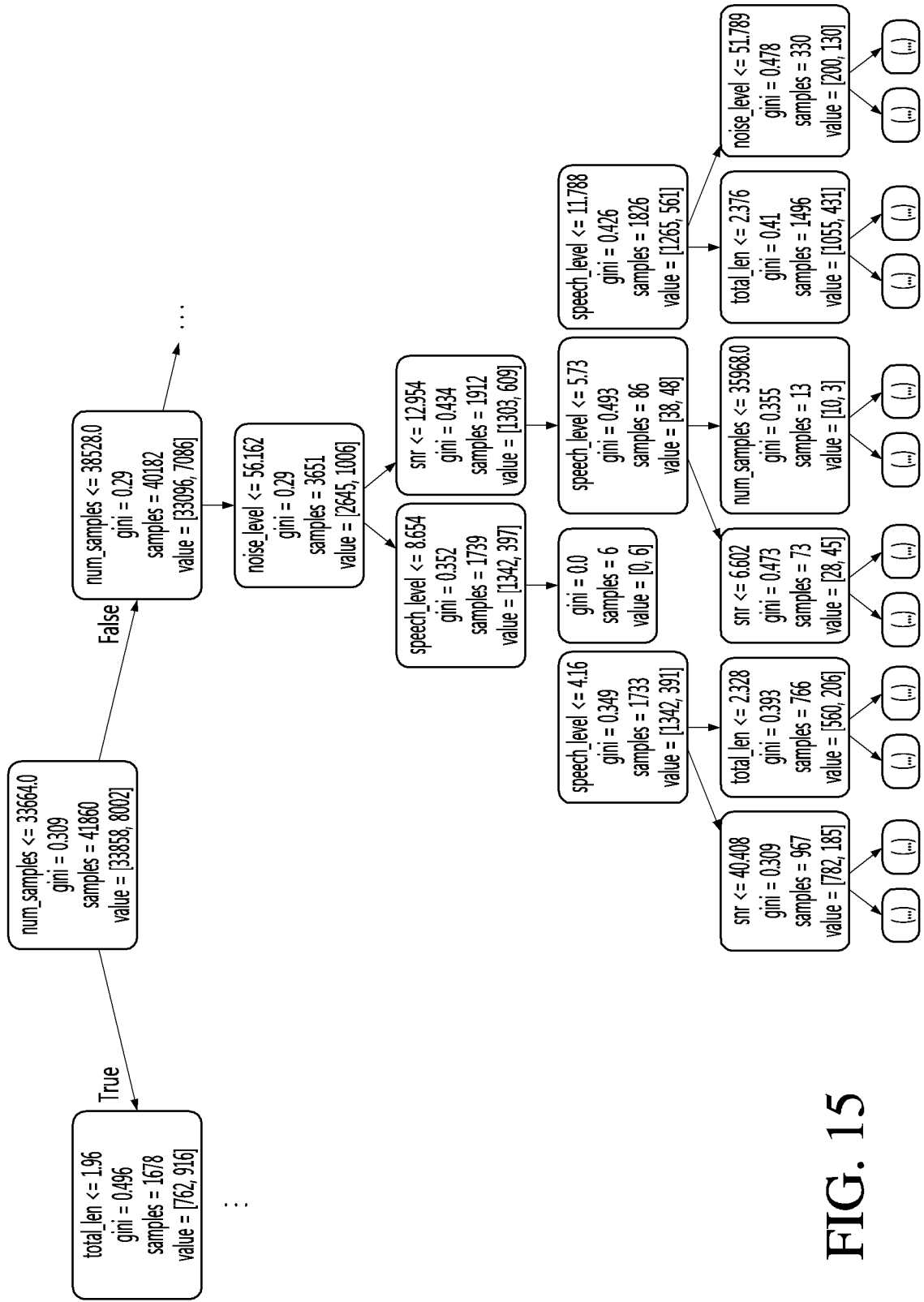
FIG. 15 is a view illustrating an abnormal feature determination model learned through a decision tree learning algorithm according to an embodiment of the present invention.

FIG. 15 is a view illustrating an abnormal feature determination model learned through a decision tree learning algorithm according to an embodiment of the present invention.

Referring to FIG. 15, the abnormal feature determination model may be learned through the decision tree learning algorithm.

In detail, the abnormal feature determination model is learned by using the training speech signal labeled thereon with the success state of the speech recognition. When the data feature set is extracted from each speech signal, the decision tree is generated based on information on the success state of the speech recognition corresponding to the extracted data feature set.

A threshold value to determine the success state of the speech recognition with respect to each of features forming the data feature set may be obtained through the decision tree. The normal range and the abnormal range for each feature may be obtained based on the threshold value obtained with respect to each feature.

Accordingly, the abnormal feature determination model may include information on the normal range and the abnormal range for each feature.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence (AI) apparatus for recognizing a speech of a user, the artificial intelligence apparatus comprising:
a memory configured to store a speech recognition model; and
a processor configured to:
obtain a speech signal for a user speech,
convert the speech signal into a text using the speech recognition model,
measure a confidence level for the conversion of the converted text,
based on the measured confidence level being equal to or greater than a reference value, perform a control operation corresponding to the converted text, and
based on the measured confidence level being less than the reference value,
obtain information on a cause of lowering the measured confidence level,
extract a data feature set including a plurality of first features from the speech signal,
determine at least one abnormal feature among the extracted data feature set by determining an abnormal degree for each plurality of first features based on an extent that each feature deviates from a normal range using an abnormal feature determination model, wherein an abnormal feature is determined as the cause of lowering the confidence level, wherein the abnormal feature determination model includes information on threshold ranges for the plurality of first features and rank information on a rank of the corresponding threshold range to each of the plurality of first features, wherein the rank of the corresponding threshold range is determined to be higher as an influence on the confidence level is higher,
determine a rank between abnormal features based on the determined abnormal degree for each plurality of first features,
generate feedback based on the obtained information, the determined abnormal feature, and the rank between the abnormal features, and
provide the feedback for the conversion of the converted text.

2. The AI apparatus of claim 1, wherein the processor is configured to generate the feedback including a notification of information on the abnormal feature as the cause of lowering the confidence level.

3. The AI apparatus of claim 1, wherein the processor is configured to generate the feedback including a suggestion of a manner of changing the abnormal feature to a normal feature to enhance the confidence level.

4. The AI apparatus of claim 1, wherein the data feature set includes at least one of a single speech source state, a speech level, a noise level, a signal to noise ratio (SNR), a speech speed, a word number, a word length, a clipping existence state, or a clipping ratio.

5. The AI apparatus of claim 1, wherein the processor is configured to:
 extract a recognition feature set including a plurality of second features from the speech signal, and
 determine the confidence level by using a confidence level measurement model and the plurality of second features,
 wherein the confidence level measurement model is a model to output a confidence level for the corresponding speech signal when the plurality of second features are input.

6. The AI apparatus of claim 5, wherein the confidence level measurement model is an artificial neural network learned based on a machine learning algorithm or a deep learning algorithm and is learned to reduce a difference between a value, which is output when the recognition feature set extracted from a training speech signal is input, and a confidence level, which is previously provided, corresponding to the training speech signal.

7. A method for recognizing a user speech, the method comprising:
 obtaining a speech signal for the user speech;
 converting the speech signal into a text using a speech recognition model;
 measuring a confidence level for the conversion of the converted text;
 based on the measured confidence level being equal to or greater than a reference value, performing a control operation corresponding to the converted text; and
 based on the measured confidence level being less than the reference value,
 obtaining information on a cause of lowering the measured confidence level,
 extracting a data feature set including a plurality of first features from the speech signal,
 determining at least one abnormal feature among the extracted data feature set by determining an abnormal degree for each plurality of first features based on an extent that each feature deviates from a normal range using an abnormal feature determination model, wherein an abnormal feature is determined as the cause of lowering the confidence level, wherein the abnormal feature determination model includes information on threshold ranges for the plurality of first features and rank information on a rank of the corresponding threshold range to each of the plurality of first features, wherein the rank of the corresponding threshold range is determined to be higher as an influence on the confidence level is higher,
 determining a rank between abnormal features based on the determined abnormal degree for each plurality of first features,
 generating feedback based on the obtained information, the determined abnormal feature, and the rank between the abnormal features, and
 providing the feedback for the conversion of the converted text.

8. A non-transitory recording medium having recorded thereon a program for performing a method for recognizing a user speech, the method comprising: obtaining a speech signal for the user speech; converting the speech signal into a text using a speech recognition model; measuring a confidence level for the conversion of the converted text; based on the measured confidence level being equal to or greater than a reference value, performing a control operation corresponding to the converted text; and based on the measured confidence level being less than the reference value, obtaining information on a cause of lowering the measured confidence level, extracting a data feature set including a plurality of first features from the speech signal, determining at least one abnormal feature among the extracted data feature set by determining an abnormal degree for each plurality of first features based on an extent that each feature deviates from a normal range using an abnormal feature determination model, wherein an abnormal feature is determined as the cause of lowering the confidence level, wherein the abnormal feature determination model includes information on threshold ranges for the plurality of first features and rank information on a rank of the corresponding threshold range to each of the plurality of first features, wherein the rank of the corresponding threshold range is determined to be higher as an influence on the confidence level is higher, determining a rank between abnormal features based on the determined abnormal degree for each plurality of first features, generating feedback based on the obtained information, the determined abnormal feature, and the rank between the abnormal features, and providing the feedback for the conversion of the converted text.

* * * * *